Figure 1:
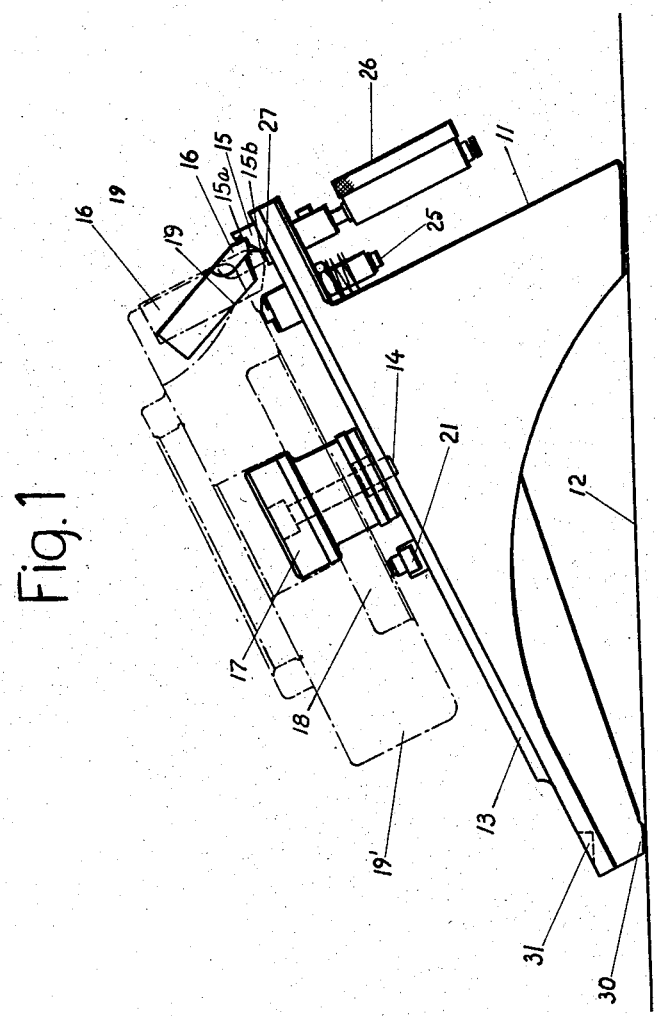

May 5, 1959    E. N. BERGSTRÖM    2,884,700
FIXTURE FOR TRUING MILLING CUTTERS HAVING
INSET CUTTER BLADES

Filed June 5, 1957    2 Sheets-Sheet 1

INVENTOR
Eskil Natanael Bergström
By Pierce, Scheffler & Parker
Attorneys

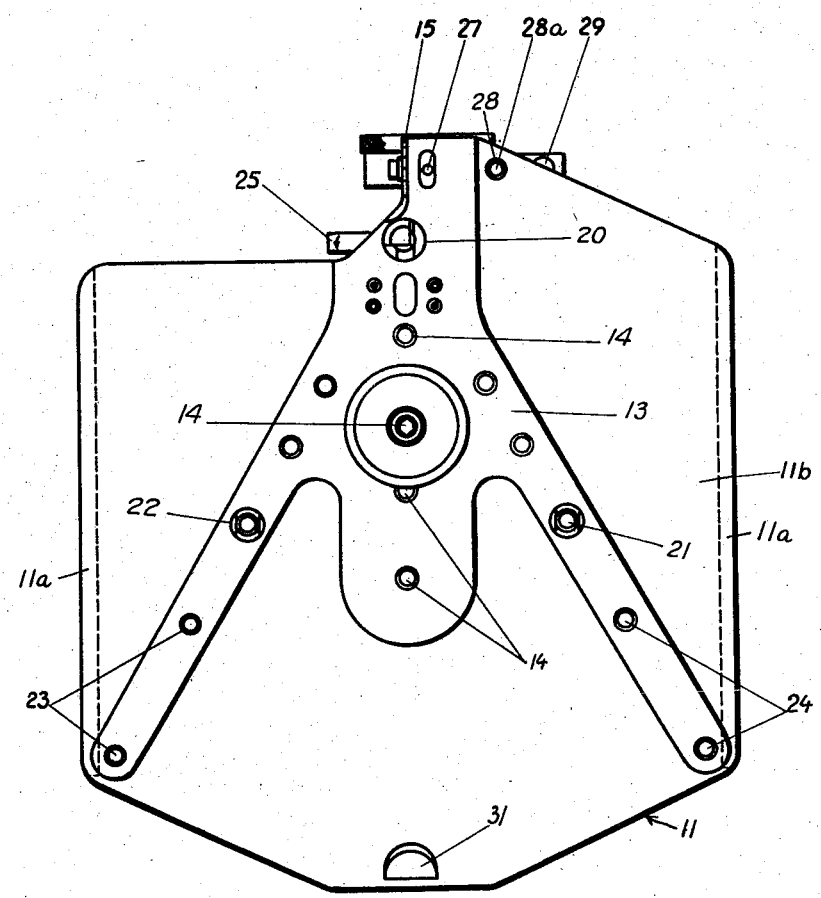

United States Patent Office 2,884,700
Patented May 5, 1959

2,884,700

FIXTURE FOR TRUING MILLING CUTTERS HAVING INSET CUTTER BLADES

Eskil Natanael Bergström, Sandviken, Sweden, assignor to Sandvikens Jernverks Aktiebolag, Sandviken, Sweden, a corporation of Sweden Application June 5, 1957, Serial No. 663,791

9 Claims. (Cl. 33—185)

The present invention relates to fixtures for truing cutting tools such as milling cutters and the like, and is more particularly directed to an improved fixture for truing milling cutters of the type provided with inset and removable cutter blades.

It is most important in connection with such cutting tools that the inset cutter blades be adjusted with exactness in order that the tool may operate satisfactorily and each blade perform its function during the milling or other cutting operation. In order to adjust the individual cutter blades in the body of the milling cutter there have been constructed truing and/or grinding fixtures which comprise a vertical shaft or pin of the same diameter as the center opening in the milling cutter. At the side of this shaft was located a truing gauge in the form of an adjustable shoulder against which by means of pressure the lower part of each cutter blade was brought to bear. Because of the necessity for establishing the same direction and force for this pressure in order to obtain a correct adjustment of the cutter blades after tightening the lock screws which serve to hold the cutter blades in their respective slots in the body, it has been difficult to obtain an exact adjustment for the assembled blades in the body without resort to a subsequent finish grinding operation. This subsequent finish grinding operation has been found necessary both with facing cutter truing with the lower machining surface extending perpendicular to the shaft of the milling cutter, and with corner cutter truing with the outer side machining surface extending parallel to the mentioned shaft.

It has also been known to construct a truing and/or grinding fixture with a horizontal centering and support pin for the milling cutter. With this type of fixture similar disadvantages are present as the height of the support pin above the floor on which the fixture is mounted will limit the useful range of the fixture to small and possibly also middle-sized cutter diameters.

In accordance with the present invention, it is an object to provide an improved construction for a truing fixture for milling and like cutting tools of the type having inset and removable cutter blades which has none of the disadvantages present in the constructions known in the prior art. The improved fixture according to the invention is characterized by a support inclined to the horizontal upon which the milling cutter body is mounted for rotation about an axis inclined to the horizontal, there being a stationary gauge provided on the support and into engagement therewith are brought in succession the lower ends of the cutter blades. Because of the inclined attitude of the support and milling cutter body, gravitational forces rather than manual forces are utilized to move the cutting edges of the cutter blades into contact with the gauge. That is to say, the individual cutter blades simply drop by their own slight weight into contact with the gauge which fixes them in proper position. After each cutter blade falls into contact with the gauge, the lock screw or screws or other fastening means for that blade are tightened to thus secure the same firmly in its proper position. Since an exact truing of all blades is thus obtained and no grinding after assembly is required, it is possible to assemble ready ground blades onto the milling body.

Another advantage of the invention is that it becomes possible to replace any one or more blades if they should become damaged during use without the necessity for changing the adjustment of the other blades on the milling body. Still another advantage of the invention is that the improved truing fixture is usable with milling cutters of various diameters.

The foregoing as well as other objects and advantages of the invention will become more apparent from the following detailed specification which describes one practical embodiment for the invention and from the accompanying drawings which illustrate the same.

In the drawings, Fig. 1 is a side elevation of the truing fixture and with a milling cutter mounted thereon and Fig. 2 is top plan view of the fixture but with the milling cutter removed.

With reference now to the drawings, the fixture includes an inclined supporting member 11 having a pair of parallel spaced upright side plates 11a at one end which contact the base 12 such as the surface of a table, work bench or the like, and a central depending foot member 30 intermediate the side plates which contacts the base 12 at the other end of the member 11. Extending between the side plates 11a and inclined to the base 12 is a plane surfaced portion 11b upon which is mounted a plate 13 provided with one, and preferably a plurality of centering holes 14 for receiving a centering pin 17 by which the milling cutter 19' is mounted on the fixture for rotation about an inclined axis represented by the axis through the centering pin 17 which axis is perpendicular to the plane of plate 13. The particular hole 14 utilized depends upon the diameter of the milling cutter. Plate 13 may have any arbitrary plane configuration and in the drawing is shown to be of substantially Y form. The angle of inclination of plate 13 in the embodiment illustrated is about 25° but such angle may, in accordance with the configuration of the milling cutter, be varied between 3° and 60°, suitably between 5° and 45°. It has often shown itself to be suitable with a lower limit of 10°. Also, it is possible to construct the fixture so that the angle of inclination may be adjusted.

Positioned adjacent the highest part of the support plate 13 is a gauge 15 having one or more fixed gauging positions or surfaces, for example for facing or corner milling truing, or step milling truing, of a milling cutter with inset cutter blades, for example of the type shown in Swedish Patent No. 134,254, or United States Patent No. 2,584,449, or British Patent No. 626,812, or French Patent No. 952,910, etc. All of such milling cutters are characterized by a milling cutter body provided with a plurality of radially extending grooves at the periphery thereof in which are set the cutter blades which do the cutting, the blades being secured in the grooves or channels by any suitable fastening means such as wedges or set screws and the like, and the adjustment of the blades being essentially axially of the main body of the cutter.

The milling cutter is indicated in Fig. 1 in chain lines only in order to simplify illustration and only one of the cutter blades mounted in a radially extending groove of the cutter has been indicated, this being blade 16. The position of blade 16 indicated by solid lines is for truing the cutter blades for plane milling and the position indicated by the chain lines is for blade truing for corner milling. For the former, the lower end of the cutter bears by virtue of its own slight weight only against the shouldered surface 15a of gauge 15, and for the latter, the lower end of the cutter bears likewise by virtue of its own weight only against a second shouldered surface 15b of gauge 15.

As indicated in Fig. 1, as each one of the cutter blades 16 in its groove 19 in the body of the milling cutter 19' is brought into position in alignment with the gauge 15, the blade 16 will descend by gravity only into gentle contact with the gauging surface 15a or 15b of the gauge without the need for use of any other force. Consequently all of the blades 16 will be subject to the same radial and axial pressure against the gauge and hence will be trued with an extreme degree of exactness. As each blade 16 is trued in its proper position in the body of the milling cutter 19', the fastening means for such blade (not shown) are tightened, and the milling cutter rotated slightly to bring the next blade 16 into its proper position for truing by gauge 15. This process is repeated until all blades have been trued and tightened in the milling cutter. The gauge 15 is exchangeably mounted on the plate 13 and it is of course possible to mount an adjustable gauge on plate 13.

In order to support the milling body 19' for rotation about the axis of pin 17, it will be noted that a plurality of supporting pegs such as the pegs 20, 21 and 22 upstand upon the plate 13 and are adapted to slide or roll in contact with the under surface of the milling body 19' as it is rotated about the axis of shaft 17. The peg 20 closest to the gauge 15 is fixed as to its position but the two other pegs 21 and 22 are preferably arranged for location in spaced recesses 24, 23 respectively. The recesses 24, 23 and arranged in two rows the axes of which converge and meet at the center of peg 20, and the row of holes 14 in which the centering pin or shaft 17 is to be located forms a bisector for the two rows of recesses 24, 23. As is evident, when a smaller diametered milling cutter is to be mounted on the fixture, the centering pin 17 will be located in one of the holes 14 closer to the gauge 15 and the pegs 21 and 22 will be located in those recesses 24, 23 closer to the peg 20. Correspondingly, when larger diametered milling cutters are to be mounted on the fixture, the centering pin 17 will be moved to one of the holes 14 further away from gauge 15 and likewise so also the pegs 21, 22 from the peg 20. In such manner, milling cutters of various diameters for example from 110 to 400 mm. can be assured of adequate rotational support on the fixture.

If desired, the peg 20 may be arranged so that it can be lowered and raised, for example by a spring-loaded adjusting device 25 or the like, in order to make it possible to turn some cutter blades past the gauge 15 without striking. This arrangement may be substituted with a raisable and lowerable adjustment dial type indicator.

In order to be able to measure the truing, i.e. the adjustment of each cutter blade, after engagement with the gauge 15, a dial type indicator 26 with an actuator shaft terminating in a tip 27 may be arranged in the path of rotation of the blades. Thus, after a particular blade 16 has been set by the gauge 15 and the milling body 19' rotated to bring the next blade into position for truing, the blade previously trued and set will then contact and depress the tip 27 of the indicator 26 and the blade setting can then be read off the dial. Preferably the indicator 26 can be located to either side of the gauge so as to operate satisfactorily with either clockwise or counterclockwise rotation of the milling cutter. In this connection, the indicator body is provided with a pair of spaced holes 29 which are aligned alternatively with hole 28 in the mounting plate 11b and a fastening screw 28a passed through the aligned holes serves to secure the indicator 26 to plate 11b. In the illustrated setup, the indicator mounting is such that tip 27 of the indicator lies to the right of the gauge 15. Consequently, the milling cutter to be trued would be rotated clockwise as viewed in Fig. 2 as the teeth are gauged and set in a consecutive manner. If it is desired that the milling cutter be trued in a counterclockwise rotative manner, then the indicator 26 would be shifted to the left from the position shown in Fig. 2 in which event the indicator mounting hole 29 shown in the drawing would be aligned with hole 28 and screw 28a refastened. Shifting of the indicator to the left in such manner would thus bring the tip 27 to the left of gauge 15 as viewed in Fig. 2.

In conclusion it will be understood that various changes may be made in the construction illustrated and described without, however, departing from the spirit and scope of the invention as defined in the appended claims.

I claim:

1. A fixture for truing milling cutters of the type provided with a plurality of radially extending grooves at the periphery thereof in which cutter blades are inset and removably secured thereto and wherein said cutter blades are slidably adjustable in said grooves in a direction essentially axially of the cutter, said fixture comprising an inclined support, means on said support for mounting the milling cutter for rotation about its axis in a plane inclined to the horizontal and with the cutting edges of the blades at the lower ends thereof, and a gauge carried by said support for truing the cutting edge at the lower end of each cutter blade in succession, said cutter blades being slidable downwardly in said grooves by gravity into engagement with said gauge.

2. A fixture for truing milling cutters of the type provided with a plurality of radially extending grooves at the periphery thereof in which cutter blades are inset and removably secured thereto and wherein said cutter blades are slidably adjustable in said grooves in a direction essentially axially of the cutter, said fixture comprising an inclined support plate, means on said support plate for mounting the milling cutter for rotation about its axis and in a plane parallel to said inclined support plate and with the cutting edges of the blades at the lower ends thereof, and a gauge carried by said support plate for truing the cutting edge at the lower end of each cutter blade in succession, said cutter blades being slidable downwardly in said grooves by gravity into engagement with said gauge.

3. A fixture as defined in claim 2 wherein said mounting means for the milling cutter comprises a row of holes in said plate spaced at different distances from said gauge and a centering pin insertable in a selected one of said holes, said centering pin serving to pass coaxially through and support the milling cutter for rotation thereon.

4. A fixture as defined in claim 1 wherein said gauge is comprised of a plate provided with gauging surfaces at different heights and said gauging surfaces being in line with a radius from the axis of rotation of the milling cutter.

5. A fixture as defined in claim 1 and which further includes a dial indicator mounted on said support laterally of said gauge, said dial indicator being located in the path of travel of said cutter blades after gauging and actuated by said cutter blades.

6. A fixture as defined in claim 2 and which further includes a plurality of supporting pegs on said support plate and which are adapted to engage the underside of the milling cutter to facilitate rotation and support thereof.

7. A fixture as defined in claim 6 wherein at least one of said pegs is arranged to be lowered and raised.

8. A fixture as defined in claim 6 wherein said pegs are adjustable to different positions at different distances from the axis of rotation of the milling cutter.

9. A fixture as defined in claim 8 wherein said different positions of said pegs are located in two converging straight lines.

References Cited in the file of this patent

UNITED STATES PATENTS 2,780,873    Pedersen _____ Feb. 12, 1957